Sept. 17, 1946.    E. R. WILLIAMS    2,407,754
PRESSURE RELIEF VALVE
Filed Feb. 2, 1945    2 Sheets-Sheet 1

Elmer R. Williams
INVENTOR

ATTORNEY

Sept. 17, 1946.  E. R. WILLIAMS  2,407,754
PRESSURE RELIEF VALVE
Filed Feb. 2, 1945  2 Sheets-Sheet 2
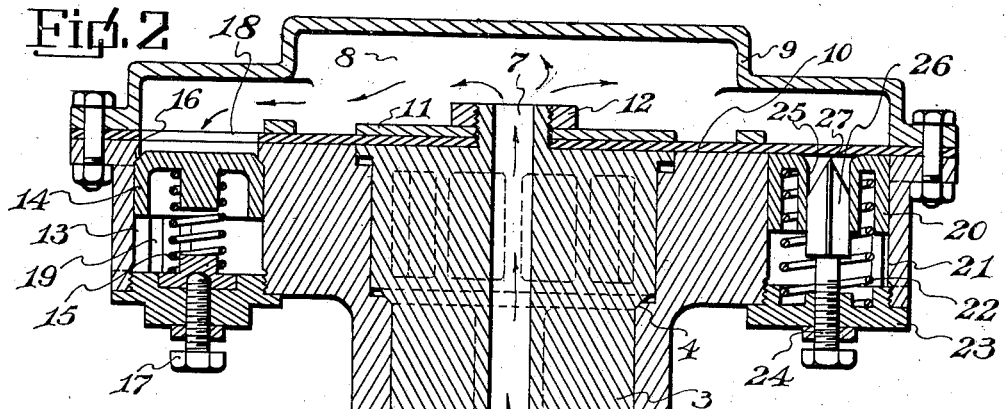
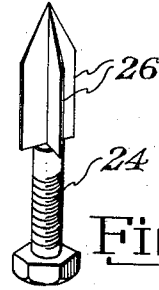
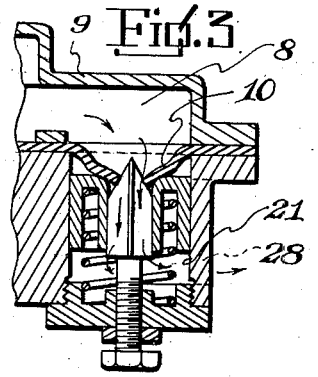
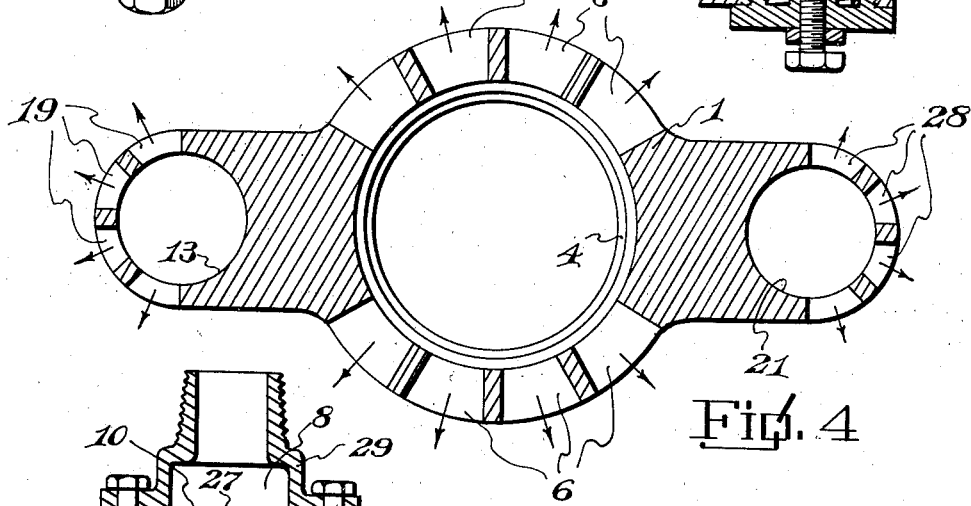
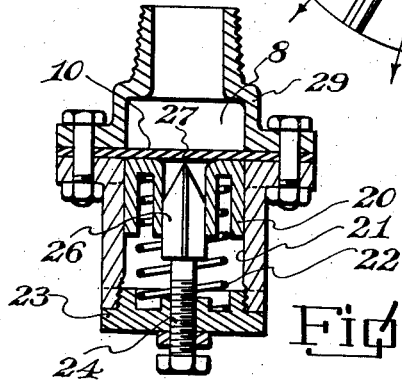
Elmer R. Williams
INVENTOR
BY
ATTORNEY Patented Sept. 17, 1946

2,407,754

UNITED STATES PATENT OFFICE 2,407,754

PRESSURE RELIEF VALVE

Elmer R. Williams, Tulsa, Okla.

Application February 2, 1945, Serial No. 575,788

2 Claims. (Cl. 137—53)

The invention relates to pressure relief valves and has for its object to provide a device of this kind whereby a diaphragm is punctured when pressure in a pipe line or receptacle exceeds a predetermined amount, and the pressure fluid is exhausted to the atmosphere.

A further object is to dispose a slide valve under spring tension within a cage, and against one side of the diaphragm, and to provide a piercing member extending through the valve, and adapted to pierce the diaphragm when the pressure on the opposite side of the diaphragm exceeds the predetermined setting of the spring actuated valve.

A further object is to provide a safety relief valve for pipe lines and tanks comprising a central valve seated in a casing and attached to the under side of a diaphragm in a cover casing having a pressure chamber therein, a pop-off valve to one side of the central valve and adapted to maintain a predetermined pressure fluid under normal operating conditions above the central valve by controlling the exhaust of pressure fluid from above the central valve, and a puncture valve to one side of the central valve and adapted to puncture the diaphragm and allow relief of pressure fluid in the cover chamber to the atmosphere, and the unseating of the central valve by excess pressure fluid surges thereunder for further exhaust to the atmosphere if the pop-off valve becomes stuck or does not operate.

A further object is to adjustably mount the diaphragm punching member so that its point can be adjusted in relation to the diaphragm and to provide the piercing end with a plurality of wings for allowing passage of fluid downwardly and to the atmosphere.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 2 is a vertical longitudinal sectional view through the relief valve.

Figure 3 is a detail sectional view through the fracture valve.

Figure 4 is a horizontal sectional view through the casing.

Figure 5 is a detail perspective view of the fracture valve piercing member.

Figure 6 is a vertical transverse sectional view through a fracture valve structure, adapted to be used independent of a relief valve structure.

Figure 1:
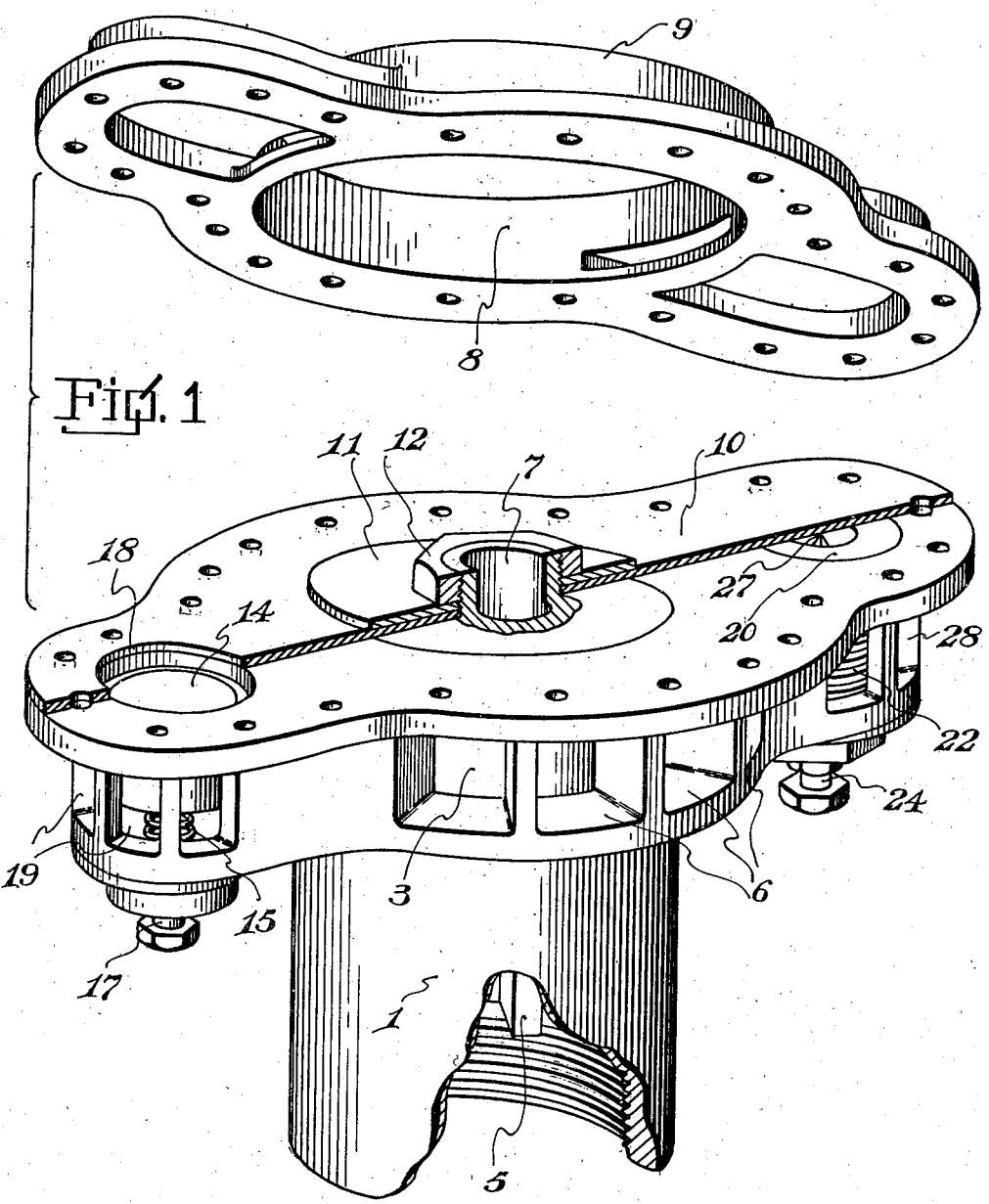
Figure 1 is a collective perspective view of the pressure relief valve showing the cover plate or hood separated from the main casing.

Referring to the drawings, the numeral 1 designates a valve casing, branch 2 of which is adapted to be threaded onto a pipe or nipple, carried by a pipe line through which pressure passes from a storage tank or the like, and from which tank pressure is relieved when it exceeds a predetermined amount.

Vertically movable and slidable in the casing 1 is a slide valve 3, which cooperates with a valve seat 4, and the valve's lower part is provided with vanes or ribs 5, which allow exhaust of air through the side ports 6 of the casing, under excess pressure for relief of pressure in the line to the atmosphere. The valve 3 is provided with a vertically extending port 7, through which normal pressure passes to the chamber 8 of the cover plate 9 without unseating slide valve 3. Valve 3 normally is maintained closed by the equalization of pressure below the valve and in the chamber 8 and by the excess downward pressure on the upper end of the valve 3, incident to its upper end having a larger area than the lower end. Valve 3 opens only on sudden surges of pressure such as caused by pumping gaseous fluid into a tank, on which the device is placed, or where a gasoline tank is subjected to heat which suddenly expands the gases rising from the gasoline therein. The cover 9 clamps a diaphragm 10 on the upper side of the casting or casing 1, and the diaphragm is connected to the upper end of the valve 3 by a plate 11 and nut 12. Therefore it will be seen that when the valve 3 is raised from its seat 4 the pressure fluid will escape through the ports 6. Slidably mounted in a chamber 13 to one side of the casing 1 is a pop-off valve 14, which is spring pressed by means of a spring 15 against the seat 16, and the amount of expansive pressure of the spring 15 may be varied and adjusted by means of the adjusting bolt 17. Assuming the pop-off valve spring 15 is adjusted for maintaining a 100 pound pressure in the chamber 8, it will be seen that excess pressure will pass downwardly through the diaphragm opening 18 and force the valve 14 downwardly, thereby compressing spring 15, and allowing small amounts of excess pressure fluid to pass to the atmosphere through ports 19 in the casing 1 without unseating slide valve 3. When the pressure is reduced valve 14 will be again seated.

It has been found that the pop-off valve will become stuck at times, hence to prevent damage to the storage receptacle or pipe line an auxiliary relief valve is provided. The auxiliary relief valve 20 is vertically slidable in a chamber 21 in the casing 1, and is forced upwardly against the under side of the diaphragm 10 by means of an expansion spring 22. The expansion spring 22 is set for exerting a greater pressure, for instance one hundred and twenty pounds which is above the one hundred pound pressure of spring 15. Threaded into the bottom of the chamber 21 is a cap 23 having an adjustable piercing member 24 threaded therethrough and extending upwardly through a bore 25 of the valve 20 and terminating in wings 26, and a piercing point 27. The point 27 is adjusted slightly below the under side of the diaphragm 10, however it is adapted to pierce the diaphragm when excessive pressure builds up in the chamber 8, incident to the sticking of pop-off valve 14. When the diaphragm is pierced by the excess pressure forcing the piston downwardly, as shown in Figure 3, the excess pressure is exhausted to the atmosphere through the bore 25 and then passes downwardly between the wings 26 to the chamber 21 below the valve 20, and then outwardly to the atmosphere through ports 28 in the casing. This reduces the pressure in the chamber 8 to allow the piston 3 to be unseated, incident to the greater pressure below the same and further pressure fluid will be exhausted to the atmosphere through the ports 6, thereby allowing the exhaust of a greater volume of pressure fluid. After a diaphragm rupturing operation a new diaphragm may be placed in the device or a new unit applied to the pipe line.

Referring to Figure 6 a single device is shown which may be attached to a pipe line having a pop-off valve which may become stuck, and in said figure the structure is the same as the fracture valve shown in Figure 2, excepting it is provided with a flanged fitting 29 adapted to be attached to the pressure line, otherwise the same numerals apply and the operation is the same.

From the above it will be seen that a safety valve is provided for pressure lines and pressure vessels, which is simple in construction, and one wherein excess pressure fluid will be exhausted to the atmosphere without danger to the vessels or pipe lines leading therefrom, and in case of sticking of the pop-off valve the fracture valve will be operated and the pressure fluid exhausted to the atmosphere.

The invention having been set forth, what is claimed as new and useful is:

1. A pressure relief valve comprising a casing having a chamber therein, a diaphragm in said chamber and dividing said chamber into a pressure chamber and a pressure exhaust chamber, a member slidably mounted in the pressure exhaust chamber and engaging one side of the diaphragm, an expansion spring in the pressure exhaust chamber and normally forcing the slide member against the diaphragm, a piercing member extending into the pressure exhaust chamber and through the slide member and terminating adjacent the diaphragm, the portion of the piercing member extending through the slide member having guide wings thereby providing for the passage of pressure fluid downwardly into the exhaust chamber when the diaphragm is pierced.

2. The combination with a pressure relief valve comprising a casing having a slide valve therein, a diaphragm carried by said slide valve and dividing the casing into two chambers, means for equalizing pressure above and below said slide valve, a pop-off valve for intermittently relieving excess pressure from the chamber above the diaphragm, means for puncturing the diaphragm upon failure of the pop-off valve to relieve excess pressure above the diaphragm, said piercing means comprising a spring pressed member engaging the under side of the diaphragm, a piercing member carried by the casing and extending through the spring pressed member and means for adjusting the position of said piercing member in relation to the diaphragm.

ELMER R. WILLIAMS.